United States Patent
Galazin

Patent Number: 6,000,407
Date of Patent: Dec. 14, 1999

[54] COSMETIC PERSONAL COLOR ANALYSIS METHOD AND KIT USING VALUE SCALE, COLORS, SEASONAL COLOR DESIGNATION, AND CHARTS

[76] Inventor: Norma Galazin, P.O. Box 78, Menan, Id. 83434

[21] Appl. No.: 09/336,594

[22] Filed: Jun. 21, 1999

Related U.S. Application Data

[63] Continuation-in-part of application No. 08/842,851, Apr. 17, 1997, Pat. No. 5,924,426.

[51] Int. Cl.⁶ .................................................. A45D 24/00
[52] U.S. Cl. ........................ 132/200; 132/286; 132/333; 434/100
[58] Field of Search ................................... 132/200, 286, 132/319, 333; 434/99, 100

[56] References Cited

U.S. PATENT DOCUMENTS

| | | | |
|---|---|---|---|
| 2,221,774 | 11/1940 | Bowser | 434/99 |
| 3,596,390 | 8/1971 | Scalice | 434/100 |
| 4,160,271 | 7/1979 | Grayson et al. | 434/100 |
| 4,561,850 | 12/1985 | Fabbri et al. | 434/100 |
| 4,681,546 | 7/1987 | Hart . | |
| 4,842,523 | 6/1989 | Bourdier et al. | 132/200 |
| 5,178,169 | 1/1993 | Lamie | 434/100 |
| 5,311,293 | 5/1994 | MacFarlane et al. | 434/100 |
| 5,313,267 | 5/1994 | MacFarlane et al. | 434/100 |
| 5,562,109 | 10/1996 | Tobiason | 434/100 |
| 5,643,341 | 7/1997 | Hirsch et al. | 434/100 |

OTHER PUBLICATIONS

Jackson, "Color Me Beautiful", pp. 25–59, 1980.
Jackson et al., "Color for Men" pp. 21–57, 1984.

*Primary Examiner*—Todd E. Manahan
*Attorney, Agent, or Firm*—John R. Ley; Steven J. Spellman

[57] ABSTRACT

Personal colors for cosmetics are determined by a method and a kit of equipment which determines an overall value for an individual by reference to the skin, eye, and hair features, determines a four-seasonal color designation of the individual by reference to colors such as powders applied to the skin, and presents the personal colors based on the overall value and seasonal color designation. A value determining scale is used to determine specific values of features by adjacent comparison to those features. An overall value chart contains information defining an overall value based on a predetermined multiple number of specific values of features. A seasonal color designation chart contains information defining a seasonal color designation as either summer, winter, spring, or autumn based on the relative ability of predetermined colors to blend with natural skin tone. A personal color direction chart correlates the overall value and seasonal color designation to personal colors.

25 Claims, 2 Drawing Sheets

COSMETIC PERSONAL COLOR ANALYSIS METHOD AND KIT USING VALUE SCALE, COLORS, SEASONAL COLOR DESIGNATION, AND CHARTS

CROSS-REFERENCE TO RELATED APPLICATION

This is a continuation-in-part of U.S. patent application Ser. No. 08/842,851 for "Cosmetic Personal Color Analysis Method And Kit Using Value Scale, Colors And Charts," filed Apr. 17, 1997 by the present inventor, now U.S. Pat. No 5,924,426. The subject matter of this previously filed application is incorporated herein by this reference.

FIELD OF THE INVENTION

This invention relates to personal color analysis to determine the most flattering and enhancing colors for an individual to wear in cosmetics and makeup. More particularly, the present invention relates to a new and improved method and kit of equipment which allows an individual's personal colors to be determined for cosmetics and makeup in a manner which can be easily adopted and employed by beauty consultants and other individuals trained in or familiar with the four-seasons method of personal color analysis.

BACKGROUND OF THE INVENTION

For many years, personal color analysis has been employed to assist individuals in selecting cosmetics and makeup, such as lipstick, lip liner, blush, and the like which are worn on the face. In general, the objective of personal color analysis is to identify those personal colors which most naturally blend with and compliment the natural coloration of the individual. The individual's personal colors, when worn in makeup and cosmetics, enhance natural beauty and attractiveness of the individual. Personal colors for cosmetics and makeup are primarily related to the skin, hair, and eye colors.

A widely used method of personal color analysis, commonly known as four-seasons method, classifies personal colors into four groups, each of which has been identified with a season of the year. In general, a person with personal colors of golden undertones is characterized as having "spring" or "autumn" coloration, while a person having blue undertones is characterized as having "summer" or "winter" coloration. The seasonal coloration is determined by comparing an individual's skin with a group of warm and cool colors and another group of clear and muted colors. A determination is made whether an individual's skin falls into the warm or the cool color range, and another determination is made whether the individual's skin falls into the clear or the muted range. By integrating the results of these determinations, the consultant determines the individual's "seasonal" coloration. For example, a individual with skin that best matches the cool and clear colors is categorized as winter. A chart, classified by seasons, is then referred to which identifies those personal colors that best compliment that individual.

While the use and acceptance of the four-seasons method has been widespread, effective implementation of the method requires the exercise of a great deal of subjective judgment and individual skill. Consultants usually become proficient and experienced in the four-seasons method only after analyzing many individuals. Of course, this type of personal color analysis is only as effective as the skill of the consultant. Frequently, personal color analysis using the four-seasons method suffers as a result of faulty judgments made by inexperienced consultants.

Another technique of personal color analysis is a method for determining an individual's personal colors based on correlating the relative lightness and darkness of an individual's features with the particular hue of that individual's skin color. This method is described more particularly in the above identified U.S. patent. In this method, a gray scale is first used to determine a "value" for the relative lightness or darkness of various features of the individual, such as skin, hair, and eyes. The light and dark values for each of these features are then correlated to determine the overall value of the individual. Next, the individual's hue is determined by applying red purple, red, and red yellow powders to the individual's skin to distinguish between personal colorations. By applying the powder colors directly to the skin, an accurate and realistic color evaluation can be made. Finally, a personal color direction chart is consulted to determine the individual's personal colors based on the individual's overall value and hue. This "value and hue" method can quickly, accurately, and more objectively determine personal colors.

While the value and hue method is more objective than the four-seasons method, its acceptance by beauticians, color consultants, and the public at large has not been widespread. This lack of acceptance is in large part due to the pervasiveness of the terminology of the four-season method. Through many years of use, the characterization of personal colors in terms of the four-seasons method has become ubiquitous in the beauty industry. Many make-up, clothing, and fashion companies have categorized and marketed their products based on the four-seasons terminology. Beauticians and color consultants have been reluctant to abandon the four-seasons method and terminology in which they have been trained and to which they and their customer have become accustomed. For these reasons, beauticians and color consultants are reluctant to accept any new method of color analysis which does not relate to or employ the terminology of the four-seasons method. It is with respect to this and other background information that the present invention has evolved.

SUMMARY OF THE INVENTION

One significant aspect of this invention relates to a method for determining personal colors which uses the more reliable "value and hue" techniques in a four-seasons approach to personal color analysis. A further aspect of this invention relates to a value and hue method of determining personal colors which produces results which can be used in selecting cosmetic products classified according to the familiar summer, winter, spring, or autumn terminology of the four-seasons method of color analysis. Another aspect of the present invention relates to a method for determining personal colors which offers the reliability and ease of use of the value and hue method together with the familiar nomenclature of the four-seasons method.

In accordance with these and other aspects, the present invention relates to a method of aiding personal color selection for facial cosmetics for an individual. The steps of the method include assigning an overall value of lightness or darkness to the individual by reference to at least skin and hair features of the individual based on comparing those features to a value determining or gray scale; applying at least three different predetermined colors to the skin of the individual; comparing the applied colors of the individual; assigning a seasonal color designation for the individual based on the compared colors; and correlating the overall value and seasonal color designation to determine the personal colors of the individual. Preferred additional steps of the method include assigning a specific value for each of the skin, eye, and hair features of the individual, and assigning the overall value based on the specific combination of values of these features. In addition, each specific value level may be grouped into a light, medium, or dark value group from which the overall value is determined by the number of occurrences of each value group. The three different predetermined colors are preferably selected to represent a warm-cool spectrum of colors, and those colors may be a red yellow color, a red color, and a red purple color. The seasonal designation is preferably determined by a relative ranking of the blending of each of the colors with the skin.

Also in accordance with the above-noted and other aspects, the present invention relates to a method of assigning a seasonal color designation for an individual. The steps of the method include applying three different predetermined colors to the skin of the individual, comparing the applied colors to the skin color of the individual, determining the relative degree of blending of each of the three predetermined colors with the facial skin color of the individual, classifying each of the three different predetermined colors according to their relative degree of blending with the skin color, and assigning a seasonal color designation of the individual based on the classification of the three different predetermined colors. Preferably, the three skin colors represent the end and middle points of a color spectrum, such as red yellow, red and red purple. The order of placing the three colors on the skin and comparing them to the skin color aids in making the relative ranking.

The present invention also relates to a kit of equipment. The kit is used to aid in determining the personal colors. The kit comprises a value determining scale, such as a gray scale, having information representing a plurality of different shades of gray between white and black, so the shades can be compared to the features of the individual for value. The gray scale is of a size to permit the gray scale to be placed adjacent to the features during the comparison. An overall value chart of the kit contains information defining an overall value of the individual based on a predetermined multiple number of specific values of the individual's features, such as hair, eyes and skin. At least three different predetermined colors are included in the kit for application to the skin. The colors represent a continuum of the extremes of a warm-cool spectrum of colors. A seasonal color designation chart containing information which correlates how well each of the applied colors blends with the natural skin tone to a seasonal color designation of summer, winter, spring, or autumn. A personal color direction chart is further included in the kit, and the personal color direction chart contains information which correlates values and seasonal color designations to personal colors. The colors are preferably red yellow, red, and red purple, and the colors are preferably supplied as facial powders.

Both the method and the kit of the present invention may be used relatively simply by a color consultant or by the individual herself or himself with a modest degree of experience to obtain reliable and effective personal color analysis results. Furthermore, the method and the kit of the present invention can be easily adopted by individuals previously trained in the four-seasons method of color analysis Additionally, the results obtained from the method and the kit of the present invention may be used in selecting cosmetic products classified according to the seasonal summer, winter, spring, or autumn categories of the color analysis. Further still, the results of using the present invention are considerably more reliable than the purely subjective approaches which have been used in the past.

A more complete appreciation of the present invention and its scope can be obtained by reference to the accompanying drawings, which are briefly summarized below, to the following detailed description of presently preferred embodiments of the invention, and to the appended claims.

DETAILED DESCRIPTION

Figure 1:
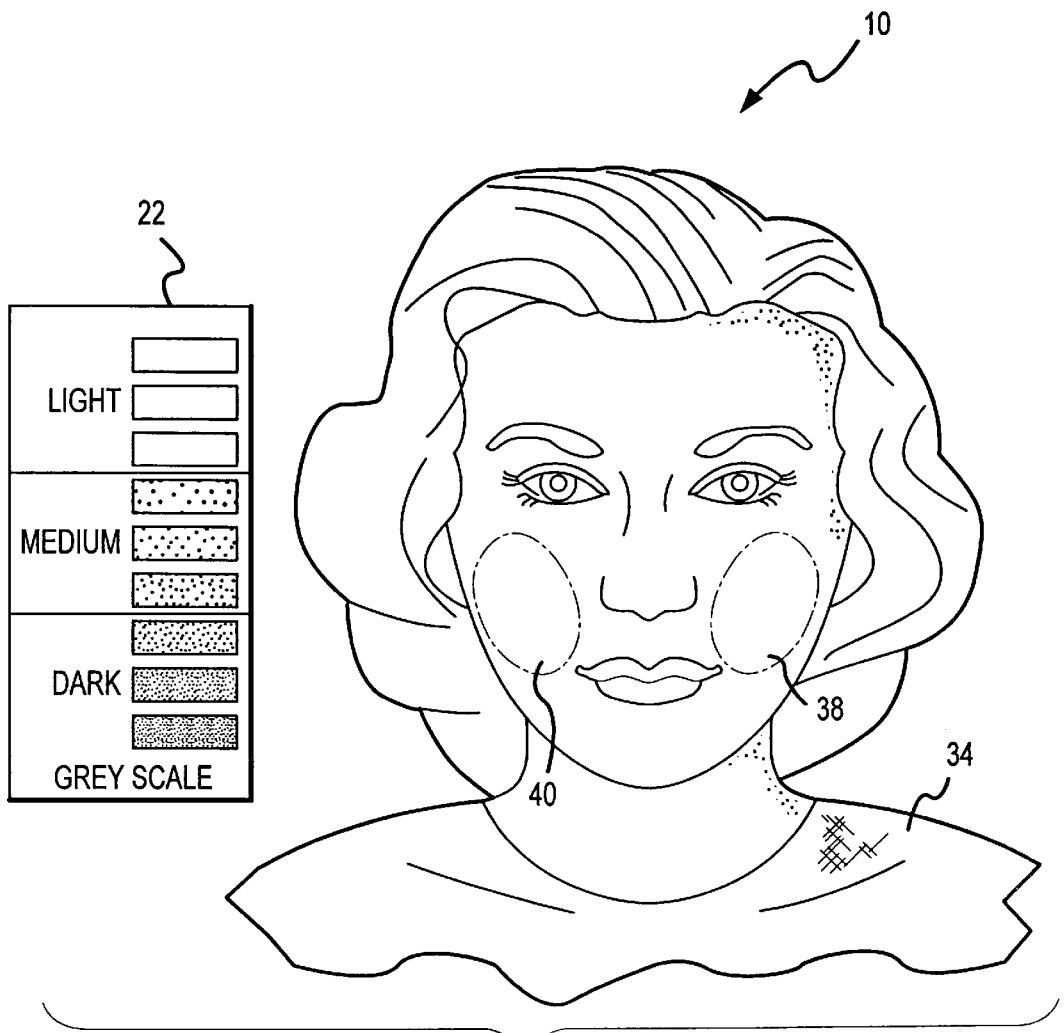
FIG. 1 is an illustration of a person or an individual upon which the method of personal color analysis incorporating the present invention is performed.

The present invention relates to a method of personal color analysis for an individual, such as the individual 10 shown in FIG. 1. Generally, the individual's personal colors are used to determine color selections for cosmetics and makeup to be worn by the individual 10. The personal colors are directly related to the individual's personal features such as skin, eye, and hair color as well as the relative intensity or value level of the colors of these features.

Figure 2:
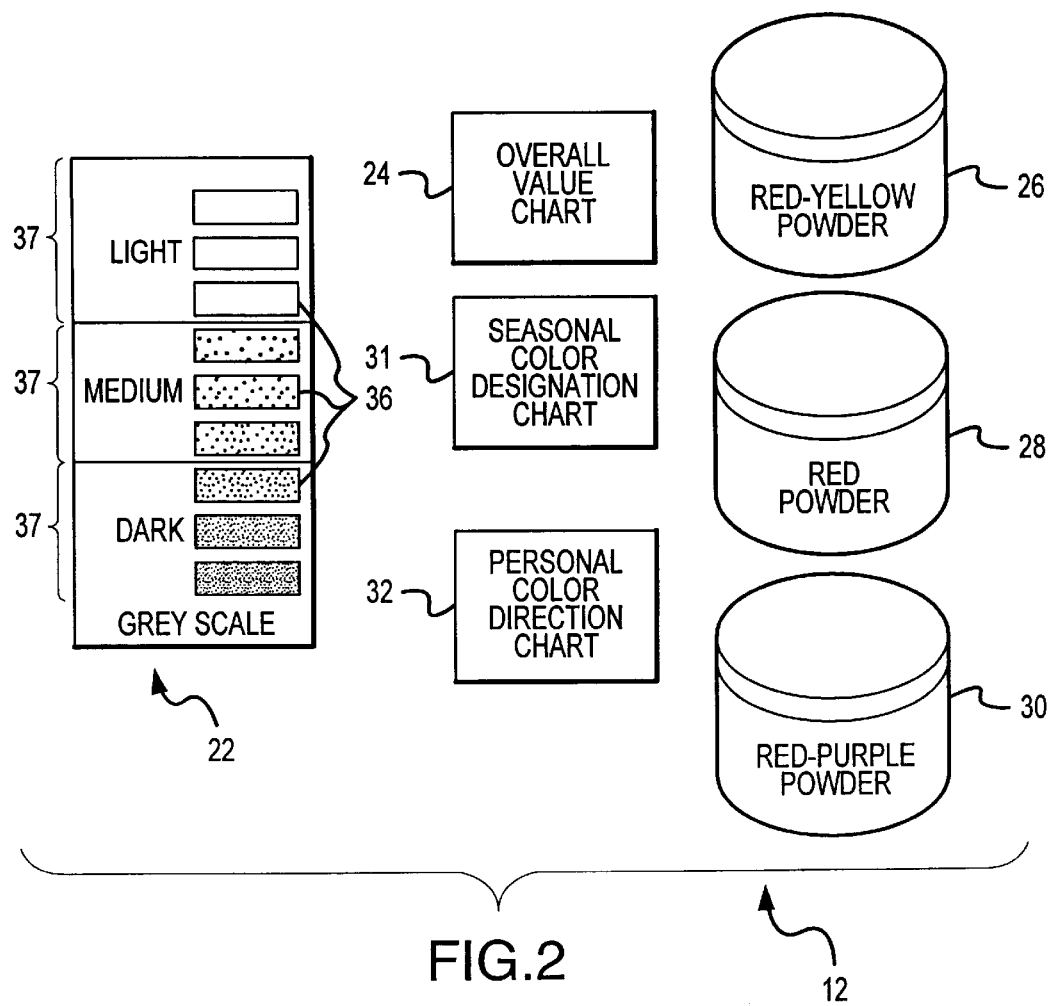
FIG. 2 is an illustration of a kit of equipment for practicing the method of personal color analysis of the present invention on the individual shown in FIG. 1.
Figure 3:
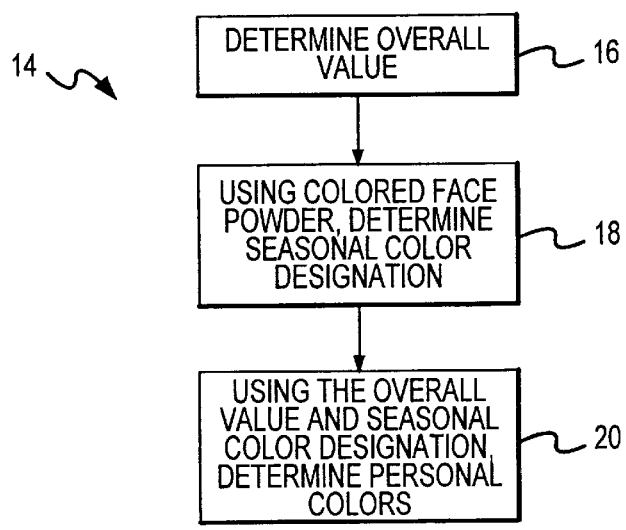
FIG. 3 is a flow chart depicting steps taken in performing the method of personal color analysis on the individual shown in FIG. 1 and using the kit shown in FIG. 2.

In general, a kit 12, shown in FIG. 2, is used to determine the individual's personal colors, by practicing a method shown generally at 14 in FIG. 3. The method 14 comprises three basic steps: determining the individual's overall value (step 16), determining the individual's seasonal color designation (step 18) and determining the individual's personal colors based on the overall value and seasonal color designation (step 20).

The kit 12 shown in FIG. 2 comprises a gray scale card 22 or other value determining scale which is used to determine the relative lightness or darkness of features of the individual 10 such as his or her skin, hair, and eyes during the performance of method step 16 (FIG. 3). The value levels determined for each of these features are integrated by the information contained in an overall value chart 24 to determine the overall value of the lightness or darkness of the individual 10. The kit 12 further comprises powders 26, 28, and 30 of three different predetermined colors (preferably red yellow, red, and red purple) which are used in performing the method step 18 (FIG. 3) to determine the individual's seasonal color designation. Three colors are applied, in two steps, to the individual's skin in the location where the cosmetics are to be applied, usually the facial skin, to distinguish very effectively between personal colorations based on a warm-cool spectrum of colors. The kit 12 includes a seasonal color designation chart 31 for use in designating the hue of the individual's skin, based on the powder evaluation, according to the well-known four-seasons terminology of summer, winter, spring, and autumn. Additionally, the kit 12 includes a personal color direction chart 32 for use in the last method step 20 (FIG. 3). The personal color direction chart 32 contains information by which to determine the individual's personal colors based on the overall value and seasonal color designation determined in method steps 16 and 18, respectively. The information contained in the charts 24, 31, and 32 is discussed more completely below.

Before beginning the method 14 to determine the personal colors as shown in FIG. 3, a preliminary step should be performed to eliminate or minimize possible color distractions. Any color distractions, such as colored clothing, colored backgrounds, or colored lighting should be eliminated or minimized to prevent confusion as to color interaction. For this reason, a white or neutral colored cloth or smock 34 (FIG. 1) should be draped over the individual to cover any colored clothing when analyzing the face. Also, distracting background colors should be either removed or minimized by placing neutral or white colors in the background. Additionally, for best results, the individual's makeup and jewelry should be removed to avoid possible distractions. Once the preliminary step of preparation is complete, the method 14 for determining the personal colors of the individual 10 may be commenced.

The individual's overall value is determined in method step 16 by first determining the respective color values or value levels of the individual's features, such as the skin in the location where the cosmetics are to be applied, primarily to the face, as well as the hair and eyes. Generally, a value level of a color is the lightness or darkness of the color. One way to conceptualize color value is by analogy to a black and white photograph. A black and white photograph displays all colors in shades of gray. The light colors appear as a light gray and darker colors appear as a darker gray. Thus, all colors can be represented in terms of a conventional gray scale such that one can determine approximately where on the gray scale the value level of each color fits.

The specific value level of each feature is determined by using a value determining scale, such as the gray scale card 22 included in the kit 12 shown in FIG. 2. The gray scale card 22 is a conventional gray scale that comprises several printed shades 36 of gray ranging between white and black. The shades 36 are divided into three value groups 37: light, medium, and dark. The shades 36 and value groups 37 allow the consultant to classify the value level of different features of the individual 10.

Although the preferred kit 12 includes the gray scale 22 of multiple values or shades 36 of the color gray, other primary and secondary colors could be used in an equivalent value determining scale. The equivalent value determining scale would be formed by multiple different shades of a single primary or secondary color ranging from light to dark or white to black. For example, an equivalent scale of varying values could be constructed using the color blue wherein the values would range from very light blue to very dark blue.

To determine the specific gray scale value levels for each individual feature, the gray scale card 22 is held near the feature, for example the skin, of the individual 10 so that direct comparisons can be made, as illustrated in FIG. 1. Visually comparing the different shades 36 of gray on the gray scale card 22 with the feature enables the user to make a determination as to which shade 36 most nearly matches the feature. Once the shade 36 has been determined, the value of that feature is placed into one of the value groups 37.

After the skin value and value group are determined, values and value groups for the hair and eyes are determined in the same manner. That is, the gray scale card 22 is held near the hair and eyes, in turn, and specific values are chosen for each of these features. From the specific values, the value group for each feature is then determined from the gray scale card 22. The specific values for the skin, hair, and eyes are independent of each other, allowing the specific values and value groups for these features to be determined in any order.

Once the value group for all of the individual features is determined, an overall value for the individual 10 must be determined. A person's overall value is distinguishable from the specific value of an individual feature. The overall value represents the combination of value groups of the person's multiple features, such as skin, eyes and hair. The information contained in the overall value chart 24 allows the consultant to use the separately determined value groups to establish an overall value for the individual 10. The information in the overall value chart 24 may be represented in different formats, two of which are reproduced below as Tables 1 and 2. That is, the information in one or both of the Tables 1 and 2 may be printed on the overall value chart 24. Using the value groups for the individual features, Tables 1 and 2 yield an overall value for the individual 10 of a category which is either Light, True, Vivid or Contrasting.

TABLE 1

|  | Light Skin | Medium Skin | Dark Skin |
| --- | --- | --- | --- |
| Light Hair and Light Eyes | Light | Light | Contrasting |
| Light Hair and Medium Eyes | Light | True | Contrasting |
| Light Hair and Dark Eyes | Contrasting | Contrasting | Contrasting |
| Medium Hair and Light Eyes | Light | True | Contrasting |
| Medium Hair and Medium Eyes | True | True | Vivid |
| Medium Hair and Dark Eyes | Contrasting | Vivid | Vivid |
| Dark Hair and Light Eyes | Contrasting | Contrasting | Contrasting |
| Dark Hair and Medium Eyes | Contrasting | Vivid | Vivid |
| Dark Hair and Dark Eyes | Contrasting | Vivid | Vivid |

TABLE 2

| Light | 2 Lights and 1 Medium | 3 Lights | |
| --- | --- | --- | --- |
| True | 2 Mediums and 1 Light | 3 Mediums | |
| Vivid | 2 Mediums and 1 Dark | 1 Medium and 2 Darks | 3 Darks |
| Contrasting | 1 Light, 1 Medium and 1 Dark | 2 Darks and 1 Light | 1 Dark and 2 Lights |

Table 1 or 2 can be used independently of each other and each will give the same overall value using the same three independently derived gray scale value groups for the hair, eyes and skin.

As will be noted from Tables 1 and 2, it may not be necessary to always value all features in order to determine the individual's overall value. If one feature of the individual 10 is in a light value group and the second feature is in a dark value group, then the individual's overall value will be contrasting regardless of the value of the third feature. However, any other combination of the first two determined value groups (two lights, two darks, two mediums, one medium and one dark, or one medium and one light) requires that the third feature be analyzed to determine the proper overall value.

With the overall value determined, the next method step 18 is to determine the individual's seasonal color designation using the seasonal color designation chart 31. An individual's seasonal color designation is a representation of the relative ability of the three colored powders 26, to blend with the natural skin tone of a particular area of the individual's skin where the cosmetic is to be applied, usually the face. The seasonal color relates to the hue of the skin, and the hue typically describes the color itself (e.g. red) independent of its intensity. A particular color may be lightened or darkened resulting in different value levels, but the hue remains the same.

The individual's seasonal color designation is determined by applying the three colors, preferably the three (red yellow, red, and red purple) colored powders 26, 28, and 30, to a selected area of skin of the individual 10 where a seasonal color determination is desired and classifying the colors according to how well each color blends, or the degree of blending of each color, with the individual's natural skin tone in the selected area. Preferably the colored powders 26, 28, and 30 are applied to the cheeks 38 and 40 of the individual 10. The colors may be classified in the seasonal color designation chart 31 as a first choice, a second choice and third choice, with the first choice being the color that blends best or has the highest degree of relative blending with the individual's natural skin tone, the second choice being the color that blends next best or has an intermediate degree of relative blending with the individual's natural skin tone, and the third choice being that color which blends the least best or has the least degree of relative blending of the three colors.

The seasonal color designation chart is typically arraigned as shown in Table 3. Application of the three colors and the determination of their ranking is explained more thoroughly below.

TABLE 3

| First Choice (Best) | Second Choice (Middle) | Third Choice (Worst) | Seasonal Color Designation |
|---|---|---|---|
| Red purple | Red | Red yellow | Summer |
| Red | Red purple | Red yellow | Winter |
| Red | Red yellow | Red purple | Spring |
| Red yellow | Red | Red purple | Autumn |

The three powders 26, 28, and 30 represent a color spectrum ranging from "cool" to "warm." The two ends of the cool-warm spectrum are generally purple and yellow using conventional Munsell notation. The middle colored powder 28 represents a color near the middle of the spectrum between the two ends or extremes. The middle color is preferably red because red is a universal color, i.e., a primary color found in all skin types. Further, since cool skin tones contain blue in combination with red, and since warm skin tones contain yellow in combination with red, the cool and warm colors are chosen to be variations of red towards these two ends or extremes of the warm-cool spectrum of colors. That is, since blue, red and yellow are the three primary colors of the color spectrum, if red is in the middle then blue and yellow are by definition at the ends or extremes of the spectrum. Therefore, variations of red towards the extremes consist of red mixed with blue on the one hand and red mixed with yellow on the other hand, e.g., red purple and red yellow respectively.

Before application of the colored powders 26, 28, and 30, a powder base should preferably be applied to the cheeks of the individual. The powder base is selected to represent the individual's natural skin tone. When applied, the powder base covers minor skin color variations and blemishes. The powder base allows the colored powder to blend with or contrast to the natural skin tones of the individual 10 so that a more effective determination of the seasonal color designation can be made. After applying the powder base, the powders 26, 28, and 30 can be applied on top of the powder base.

The first step in the application of the colored powders 26, 28, and 30 to the face of the individual involves applying the red yellow colored powder 26 to one cheek 38 or 40 and applying the red purple colored powder 30 to the other cheek. This will allow the third or worst choice of colors to be determined since the worst choice will always be one of the extreme ends of the color spectrum represented by the red yellow or the red purple colored powders 26 or 30, respectively.

After both areas 38 and 40 are colored with the powders 26 and 30, a relative comparison of how effectively the colored powders 26 and 30 blend with the individual's natural skin tone must be made. The accuracy of this comparison can be enhanced by looking at the individual's powered cheeks 38 and 40 through squinted eyes. By squinting more tightly, by bringing the eyelids closer together, one of the colored powders 26 or 30 will seem to disappear while the other colored powder 26 or 30 will remain visible. The colored powder 26 or 30 which seems to disappear will be the colored powder that blends better with the individual's natural skin tones. The colored powder 26 or 30 which remains visible will be the colored powder that blends worse with the individual's natural skin tone. The poorly-blending colored powder 26 or 30 is designated as the third or worst choice located in the third column of Table 3. The colored powder 26 or 30 which blends better with the individual's natural skin tone is left on the individual's cheek while the poorly-blending colored powder 26 or 30, along with its underlying base, is removed from its respective skin area 38 or 40. As can be seen with reference to Table 3, one of the extreme colored powders, red yellow or red purple, will always be the worst choice. This is true because the overall skin tone of the face, or other part of the body being compared, does not contain both a red yellow component and a red purple component.

Next, more powder base is applied to the area 38 or 40 from which the poorly-blending colored powder and base have previously been removed. The red colored powder 28 is then applied on top of the newly applied base powder. A comparison is then made as to which of the two remaining colors on the areas 38 and 40 blends more effectively with the individual's natural skin tone, preferably using the squinting technique described above. The remaining color which blends better with the individual's natural skin tone is designated as the first or best choice, while the other remaining color is designated as the second or middle choice. After this comparison and designation have been made, the assignment of the individual's seasonal color designation can be made by referring to the seasonal color designation chart 31. For example, and with reference to Table 3, it can be seen that an individual with a first color choice of red and a second color choice of red purple, has a seasonal color designation of winter. As can also be seen with reference to Table 3, the red colored powder 28 will always be either the first or second choice, because red is not at either end of the color continuum represented by red yellow and red purple. Red is also a primary color found in all skin types.

Determining a seasonal color designation in this manner facilitates determining the individual's exact seasonal color designation or hue. With only three choices the seasonal color designation can be determined in less time and more accurately. Also, since the colors 26, 28, and 30 represent the end and middle points of the warm-cool spectrum of actual skin tones, it is relatively easy to determine which of the three colors 26, 28, or 30, blends the best with the individual's natural skin tone on an objective basis. In all, the present process is faster and generally more accurate since less dependence is placed on the skill of the consultant.

The last method step 20 involves using the individual's overall value and seasonal color designation to determine their personal colors using the personal color direction chart 32. The chart 32 is typically set up in a matrix or grid, such as shown in Table 4, wherein the different seasonal color designations are aligned along one axis and the overall values are aligned along the other axis. Using this matrix, the overall value and seasonal color designation of the individual 10 become coordinates to locate the appropriate personal colors for the individual 10.

TABLE 4

|  | Summer | Winter | Spring | Autumn |
| --- | --- | --- | --- | --- |
| Light | Light Red Purple - Red | Light Red - Red Purple | Light Red - Yellow Red | Light Yellow Red - Red |
| True | Medium Red Purple - Red | Medium Red - Red Purple | Medium Red - Yellow Red | Medium Yellow Red - Red |
| Vivid | Dark Red Purple - Red | Dark Red - Red Purple | Dark Red - Yellow Red | Dark Yellow Red - Red |
| Con- trasting | Bright Red Purple - Red | Bright Red - Red Purple | Bright Red - Yellow Red | Bright Yellow Red - Red |

Additionally, the following eyeshadow chart shown in Table 5 can be used to determine which color of eyeshadow compliments the individual's natural features. This chart is based on the individual's seasonal color designation as in Table 3. However, no distinction is made as to the overall value in the chart of Table 5.

TABLE 5

| Summer | Winter | Spring | Autumn |
| --- | --- | --- | --- |
| Red Purple - Red | Red - Red Purple | Red - Yellow Red | Yellow Red - Red |

The information in the color direction chart (Table 4) describes a range of colors which are applicable to a person depending on that person's overall value and seasonal designation. The colors referenced in the color direction chart are described in general terms consistent with Munsell theory. In reference to these color descriptions, the initial color or color combination represents the primary component of hue. A secondary color component is separated from the primary component by a hyphen, and the secondary color component is of a lesser contribution to the overall hue compared to the primary component. The end points of the ranges of colors for some of the combinations of overall values and seasonal designations may appear to coincide in the generic information described in Table 4, but a skilled selection of the best personal colors within the indicated range for a specific individual will not overlap with the best colors of a different individual of a different seasonal designation.

The color direction chart 32 (Table 4) has been developed to help the consultant determine the personal colors for the individual 10 based on their overall value and seasonal color designation. The chart 32 (Table 4) is simple to read and the personal colors are easily determined once the overall value and seasonal color designation are determined. Simply finding the intersection where the determined seasonal color designation column meets the determined overall value row yields the correct personal colors for the individual 10. The colors located at this intersection represent a broad group of colors from which particular colors of facial cosmetics can be selected. By selecting colors which are consistent with an individual's seasonal color designation and overall value, facial cosmetics can be selected which the individual 10 can wear without negative affects. The kit 12 and method 14 allow one to determine the individual's personal colors with ease and accuracy. The method is easy to use since the first two method steps 16 and 18 require determination of the correct information based only on a direct comparison to the shades on the gray scale 22 and the three colored powders 26, 28 and 30. Furthermore, the information in the charts 24, 31, and 32 is simple to use and easy to understand.

The method 14 is also more accurate than subjective color determinations where colors are held near the face of the individual, since one of the colored powders 26, 28, and 30 blends with the skin colors disclosing the best hue of the individual 10. The powders are specially selected to eliminate many of the subjective determinations, making the best color apparent. The kit 12 also allows the individual whose personal colors are to be determined to perform the method 14 on herself or himself.

A presently preferred embodiment of the present invention and many of its improvements have been described with a degree of particularity. This description is of a preferred example for implementing the invention, but the scope of the invention should not necessarily be limited by this description. The scope of the present invention is defined by the following claims.

The invention claimed is:

1. A method of aiding personal color selection for facial cosmetics for an individual, comprising the following steps:
    comparing at least two features of the individual to a value determining scale, the features selected from a group consisting of skin, hair and eyes;
    assigning an overall value for the individual based on the comparison of the two features of the individual to the value determining scale;
    applying at least three different predetermined colors to the skin of the individual;
    comparing the applied colors to the skin of the individual;
    assigning a seasonal color designation for the individual based on the comparison of the three different predetermined colors to the skin of the individual; and
    correlating the overall value and seasonal color designation to determine personal colors of the individual.

2. A method as defined in claim 1 wherein the three different predetermined colors are a red yellow color, a red color, and a red purple color.

3. A method as defined in claim 2 wherein the step of comparing the three different predetermined colors further comprises the following steps:
    determining a relative degree of blending of each of the three predetermined colors with the facial skin of the individual; and classifying each of the three different predetermined colors as either a first choice, a second choice, or a third choice according to the relative degree of blending, the predetermined color which has a greatest relative degree of blending being classified as the first choice, the predetermined color which has an intermediate degree of blending being classified as the second choice, and the predetermined color which has a least relative degree of blending being classified as the third choice.

4. A method as defined in claim 3 wherein the step of assigning a seasonal color designation comprises the following step:
categorizing the seasonal color designation as one of summer, winter, spring, or autumn, wherein:
the summer seasonal color designation is defined by classifying the relative degree of blending of the red purple color as the first choice,
the winter seasonal color designation is defined by classifying the relative degree of blending of the red color as the first choice and classifying the relative degree of blending of the red purple color as the second choice,
the spring seasonal color designation is defined by classifying the relative degree of blending of the red color as the first choice and classifying the relative degree of blending of the red yellow color as the second choice, and
the autumn seasonal color designation is defined by classifying the relative degree of blending of the red yellow color as the first choice.

5. A method as defined in claim 4 wherein the step of applying at least three different predetermined colors further comprises the following step:
applying three different predetermined colors to at least two different application areas on facial skin of the individual.

6. A method as defined in claim 5 wherein the step of applying the three predetermined colors further comprises the following step:
applying two of the three colors to exist simultaneously on the facial skin of the individual.

7. A method as defined in claim 6 wherein the step of applying the three predetermined colors further comprises the following steps:
applying the red yellow color to a first selected area of the facial skin of the individual;
applying the red purple color to a second selected area of the facial skin of the individual;
removing one of the red yellow or red purple colors from the respective selected area of the facial skin; and
applying the red color to the selected area of the facial skin from which the one of the red yellow or red purple colors was removed.

8. A method as defined in claim 4 wherein the skin and hair features are compared to the value determining scale and wherein the step of comparing features assigning an overall value for the individual comprises the following steps:
assigning a specific value for each of the skin and hair features of the individual based on the comparisons of the skin and hair features to the value determining scale;
grouping each specific value into one of a light, medium, or dark value group; and
assigning the overall value from the number of occurrences of each value group.

9. A method as defined in claim 8 wherein the step of assigning an overall value further comprises the following steps:
providing an overall value chart containing information defining the overall value of the individual based on value groups of at least two features of the individual, the features including skin and hair; and
locating on the overall value chart an overall value for the individual based on the value groups of the skin and hair features of the individual.

10. A method as defined in claim 4 further comprising the steps of:
comparing skin, hair, and eye features of the individual to a value determining scale; and
assigning a specific value for each of the skin, hair, and eye features of the individual based on comparing of the skin, hair, and eye features to the value determining scale;
grouping each specific value into one of a light, medium, or dark value group; and
assigning the overall value from the number of occurrences of each value group.

11. A method as defined in claim 10 wherein the step of assigning an overall value further comprises the following steps:
determining the number of occurrences of each light, medium, and dark value group; and
categorizing the overall value as one of light, true, vivid, or contrasting, wherein:
the light overall value is defined by the occurrence of one of three light value groups or two light value groups and one medium value group;
the true overall value is defined by the occurrence of one of three medium value groups or two medium value groups and one light value group;
the vivid overall value is defined by the occurrence of one of two dark value groups and one medium value group or three dark value groups or two medium value groups and one dark value group; and
the contrasting overall value is defined by the occurrence of one of a singular occurrence of each value group or two dark value groups and one light value group or two light value groups and one dark value group or one dark value group and one light value group.

12. A method as defined in claim 11 wherein the step of assigning an overall value further comprises the following steps:
providing an overall value chart containing information defining the overall value of the individual based on value groups of the skin, hair, and eye features; and
locating on the overall value chart an overall value for the individual based on the value groups of the skin, hair, and eye features of the individual.

13. A method as defined in claim 4 further comprising the following steps:
removing color distractions by draping a neutral colored cloth over the individual to cover any colored clothing;
minimizing background colors by placing neutral colors in the background; and
removing any make-up and jewelry from the individual.

14. A method as defined in claim 4 wherein the step of correlating overall values and seasonal color designations to determine personal colors further comprises the following steps:

providing a personal direction chart containing information defining personal colors established by the correlation of a plurality of different overall values and a plurality of different seasonal color designations; and locating on the personal color direction chart at least one personal color of the individual based on the overall value of the individual and the seasonal color designation of the individual.

15. A kit for use in aiding personal color selection for an individual, comprising:

a value determining scale having information representing a plurality of different shades between white and black by which to compare to features of the individual, the value determining scale having a predetermined size to permit the value determining scale to be placed adjacent to the features during the comparison;

an overall value chart containing information defining an overall value of the individual based on a predetermined multiple number of values of features of the individual;

at least three colored substances of different predetermined colors for application to the skin of the individual, the three different colors representing opposite ends and a mid-point of a warm-cool spectrum of colors;

a seasonal color designation chart containing information defining a seasonal color designation based on a predetermined ranking of the capability of the three colored substances to blend with the skin of the individual; and a personal color direction chart containing information which correlates overall value and seasonal color designation to personal colors with each personal color defined by one overall value and one seasonal color designation.

16. A kit as defined in claim 15, wherein the three different predetermined colors are red yellow, red, and red purple.

17. A kit as defined in claim 16, wherein the colored substances are facial powders.

18. A kit as defined in claim 15 wherein the personal color direction chart is configured as a grid defining a plurality of columns, a plurality of rows and a plurality of row/column intersections, one of each row or column representing information describing a different overall value, the other one of each row or column representing information describing a seasonal color designation, and each row and column intersection representing personal color information corresponding to the overall value and seasonal color designation information of the row and column which form the intersection.

19. A method of assigning a seasonal color designation for an individual, comprising the following steps:

applying at least three different predetermined colors to the skin of the individual, the three predetermined colors representing opposite ends and a mid-point of a spectrum of colors;

comparing the applied colors to the skin color of the individual;

determining a relative degree of blending of each of the three predetermined colors with the skin color of the individual;

classifying each of the three different predetermined colors as either a first choice, a second choice, or a third choice according to the relative degree of blending of each of the three different predetermined colors to the skin of the individual; and assigning a seasonal color designation for the individual based on the classification of the three different predetermined colors.

20. A method as defined in claim 19 wherein the three different predetermined colors are a red yellow color, a red color, and a red purple color.

21. A method as defined in claim 20 wherein the step of applying the three predetermined colors further comprises the following steps:

applying the red yellow color to a first selected area of facial skin of the individual;

applying the red purple color to a second selected area of facial skin of the individual which is different from the first selected area;

removing one of the red yellow color or red purple color from the respective selected area of facial skin; and applying the red color to the selected area of facial skin from which the one of the red yellow color or red purple color was removed.

22. A method as defined in claim 20 wherein the step of classifying each of the three different predetermined colors further comprises:

classifying the predetermined color which has a greatest relative degree of blending with the skin of the individual as the first choice;

classifying the predetermined color which has an intermediate relative degree of blending with the skin of the individual as the second choice; and classifying the predetermined color which has a least relative degree of blending with the skin of the individual as the third choice.

23. A method as defined in claim 22 wherein the step of assigning a seasonal color designation comprises the following step:

categorizing the seasonal color designation as one of summer, winter, spring, or autumn, wherein:

the summer seasonal color designation is defined by the classification of the relative degree of blending of the red purple color as the first choice, the winter seasonal color designation is defined by the classification of the relative degree of blending of the red color as the first choice and the classification of the relative degree of blending of the red purple color as the second choice, the spring seasonal color designation is defined by the classification of the relative degree of blending of the red color as the first choice and the classification of the relative degree of blending of the red yellow color as the second choice, and the autumn seasonal color designation is defined by the classification of the relative degree of blending of the red yellow color as the first choice.

24. A method as defined in claim 19 wherein the step of applying the three predetermined colors further comprises the following steps:

applying the color representing one end of the spectrum of colors to a first selected area of facial skin of the individual;

applying the color representing the other end of the spectrum of colors to a second selected area of facial skin of the individual which is different from the first selected area;

removing one of the color representing one end of the spectrum of colors or the color representing the other end of the spectrum of colors from the respective selected area of facial skin; and applying the color representing the mid-point of the spectrum of colors to the selected area of facial skin from which one of the color representing one end of the spectrum of colors or the color representing the other end of the spectrum of colors was removed.

25. A method as defined in claim 24 wherein:

the step of classifying each of the three different predetermined colors further comprises:
- classifying the predetermined color which has a greatest relative degree of blending with the skin of the individual as the first choice;
- classifying the predetermined color which has an intermediate relative degree of blending with the skin of the individual as the second choice; and
- classifying the predetermined color which has a least relative degree of blending with the skin of the individual as the third choice; and the step of assigning a seasonal color designation comprises the following step:
- categorizing the seasonal color designation as one of summer, winter, spring, or autumn, wherein:
  - the summer seasonal color designation is defined by the classification of the relative degree of blending of the color representing one end of the spectrum of colors as the first choice,
  - the autumn seasonal color designation is defined by the classification of the relative degree of blending of the color representing the other end of the spectrum of colors as the first choice;
  - the winter seasonal color designation is defined by the classification of the relative degree of blending of the color which represents the mid-point of the spectrum of colors as the first choice and the classification of the relative degree of blending of the color representing the one end of the spectrum of colors as the second choice; and
  - the spring seasonal color designation is defined by the classification of the relative degree of blending of the color which represents the mid-point of the spectrum as the first choice and the classification of the relative degree of blending of the color representing the other end of the spectrum of colors as the second choice.

* * * * *

UNITED STATES PATENT AND TRADEMARK OFFICE
CERTIFICATE OF CORRECTION

PATENT NO  :  6,000,407
DATED      :  December 14, 1999
INVENTOR   :  Norma Galazin It is certified that error appears in the above-identified patent and that said Letters Patent is hereby corrected as shown below:

Title page, filing date should be corrected to read:

item [22] Filed: June 18, 1999

Signed and Sealed this

Twenty-third Day of January, 2001

Attest:

Attesting Officer

Q. TODD DICKINSON
*Commissioner of Patents and Trademarks*